UNITED STATES PATENT OFFICE.

JOHN PURING, OF NEW YORK, N. Y., ASSIGNOR TO ROBESON PROCESS COMPANY, OF NEW YORK, N. Y., A CORPORATION OF NEW JERSEY.

DIRECT DYEING.

1,283,296.      Specification of Letters Patent.      Patented Oct. 29, 1918.

No Drawing.      Application filed May 1, 1917. Serial No. 165,711.

*To all whom it may concern:*

Be it known that I, JOHN PURING, a citizen of Russia, residing at New York, in the county of New York and State of New York, have invented certain new and useful Improvements in Direct Dyeing, of which the following is a specification.

This invention relates to direct dyeing; and it comprises a method of dyeing to produce various shades of yellow, brown, red, etc., wherein a sulfite liquor preparation is admixed with a body of aromatic nature, the admixture treated with a little nitric acid and the preparation thus formed is used in water solution for the direct dyeing of animal fiber, such as wool, hair, silk and leather, in various shades of yellow, brown, red, etc., all as more fully hereinafter set forth and as claimed.

In the sulfite method of making paper pulp, wood is digested with a solution of an acid sulfite; either of acid sulfite of calcium or, in case dolomitic lime is used, of a mixture of acid sulfites of calcium and of magnesium. In the digestion about half the wood goes into solution by reaction with these acid sulfites to produce organic bodies of unknown constitution which, for the sake of a name, are usually called "lignosulfonates"—lignosulfonate of calcium or lignosulfonate of magnesium. The rest of the wood is recovered as paper pulp. The sulfite waste liquor containing these organic bodies as it comes from the digester is nearly free of sulfurous acid or of acid sulfites as such; the original acid sulfite reacting with the dissolved portion of the wood to form these new compounds. This sulfite waste liquor is a material of unstable nature; it readily undergoes change and decomposition. But by proper methods of evaporation (see Patent 833,634) it may be concentrated to thick liquids or dry solids; and such preparations are on the market and are commercially available. These concentrated preparations are used in the present invention; and I shall hereinafter, unless otherwise indicated, speak more specifically of a commercial liquid preparation of a density of about 30° Baumé, carrying about 50 per cent. of solid matter and about 50 per cent. of water. When properly made this material contains its characteristic organic matters in a substantially unchanged form. Other methods of evaporation may result in far-going decomposition of the organic matters which are here utilized and produce bad results. In using the dry commercial preparations they are redissolved in water to make a 30° Baumé solution like the commercial liquid preparation just described.

The characteristic organic matters of sulfite waste liquor, whatever be their nature, have a marked affinity for nitrogenous fibers being readily removed from their solution by hide, wool, silk, hair, etc., a fact which allows the material to be used for tanning and mordanting purposes. It is a useful addition to many dyes, and in such addition frequently gives more than a simple mordanting effect.

If concentrated waste sulfite liquor be treated with nitric acid in large amounts and the reaction restrained so as not to be destructive, an effect which is apparently a nitration is obtained, the organic matters being converted into a yellow material having dyeing properties. In and of itself however this completely treated material is not of much value. With less amounts of nitric acid, conversion changes are produced in the material and substances are obtained which apparently contain both unchanged material and converted material. These mixtures however are of little value for dyeing purposes, not giving good or clear colors. If however a small amount of an aromatic material, that is of a substance which belongs to what is chemically known as the aromatic or cyclic series of carbon compounds, be added to the concentrated sulfite liquor and then a little nitric acid used, the result is a material which is useful in dyeing. The addition of nitric acid under these circumstances ordinarily results in intumescence and the production of a more or less solid material. This material may be directly used for dyeing, it not being necessary to resort to purification or other treatment. The intumesced solid is simply dissolved in water and applied to the goods (yarn, thread or cloth) to be dyed.

The results of course vary with the particular aromatic substance used, and its proportion relative to the sulfite waste liquor preparation; but they also vary, and materially so, with the amount of nitric acid used.

Phenol, anilin and many other aromatic materials which are not particularly soluble in water nevertheless dissolve in concentrated sulfite waste liquor of 30° Baumé with sufficient freedom to allow their convenient use in the present invention. Many of the liquid and solid hydrocarbons such as benzol and toluol emulsify well with this liquid. Anthracene however is difficult to dissolve or emulsify.

The dyes produced dye wool, hair, silk and leather in various shades, which are fast to soap, ammonia, soda, bleaching soda, etc. The dye is also fast against all the ordinary acids in strengths not destructive to the fiber except chromic acid. Chromic acid or bleaching powder however under some circumstances may exert an action resulting in the production of a blue black color. With small amounts of bleaching powder the change may be made to a dark brown.

If 100 parts by volume of sulfite waste liquor of 30° B. be treated with a little nitric acid, say 2 or 3 parts by volume, of commercial strong acid, a yellowish brown water soluble powder is produced, dyeing the wool and silk brownish but not in bright or good colors. If however prior to this addition of nitric acid, any one of very many aromatic compounds be added, the result is then the production of useful dyes.

In one specific embodiment of my invention, I take 100 cc. of commercial sulfite waste liquor, either the 30° B. liquid grade or a solid preparation dissolved in enough water to give this density. To it I add, say, 10 grams of alpha-naphthylamin and dissolve the latter by gentle heating. I then cool and add from 2 to 25 cc. of strong nitric acid. Intumescence results with production of a gray porous mass. This mass when dissolved in water to form a 1 or 2 per cent. solution gives a dye bath capable of directly dyeing animal fibers. The wool, silk or leather is simply immersed in the dye bath, removed, washed and dried. The shade given with this preparation depends on the amount of nitric acid used in the preparation of the dye. With small amounts, the dye gives flesh colored shades; with larger, bright yellows, and with intermediate proportions, intermediate shades. All shades are fast to soap, etc. If desired, additional nitric acid may be dissolved in the dye bath and is useful in some instances.

In making the dye, somewhat different results are obtained when the nitric acid is added in stages. For example, on dissolving 10 per cent. of alpha-naphthylamin in 30° B. liquor and adding, without cooling, 2.5 per cent. of nitric acid in successive small portions with constant stirring, a reddish brown water soluble composition is obtained. This will dye a flesh color. If now 2.5 per cent. more nitric acid be added, the composition assumes a violet color and will dye wool and silk brown from a neutral bath. The composition is soluble. On adding 5 per cent. more acid, a violent reaction takes place and the mass intumesces as described. On drying, the mass forms a blue-black powder, dyeing silk and wool a yellow brown. Not all of this powder is soluble in water and it is in general advisable to filter the dye bath. Using 20 per cent. of nitric acid in all, a brownish yellow powder is obtained which is more soluble in water and which dyes wool and silk bright yellow from a neutral bath.

While I have mentioned alpha-naphthylamin in the above examples, I wish it to be understood that for it may be substituted a wide variety of other materials of cyclic nature. I have obtained good results with phenol (both the pure phenol $C_6H_5OH$ and the impure commercial products containing cresols), the cresols, anilin, benzol, toluol, xylol, etc. Each of these materials gives somewhat different results; but all give good and useful dyes.

These are direct dyes, though they may be used with various mordants. Chrome mordants are most useful.

What I claim is:—

1. In the dyeing of animal fibers, the process which comprises mixing a thick solution of characteristic solids of sulfite waste liquor with a small amount of an aromatic cyclic substance and adding a small amount of nitric acid.

2. In the dyeing of animal fibers, the process which comprises mixing a thick solution of the characteristic solids of sulfite waste liquor with a small amount of naphthylamin and adding a small amount of nitric acid.

3. As a new dye for dyeing animal fibers, a pulverulent dry material comprising sulfite waste liquor solids, an aromatic cyclic substance and the products of reaction of nitric acid on the mixture of the two.

4. As a new dye for dyeing animal fibers, a pulverulent dry material comprising sulfite waste liquor solids, a naphthylamin and the products of reaction of nitric acid on the mixture of the two.

In testimony whereof I affix my signature.

JOHN PURING.